April 5, 1938. T. H. GROZIER Re. 20,687
MEANS FOR ARRESTING DUST AND FLUFF FROM MACHINES OR APPLIANCES FOR CUTTING PAPER AND OTHER FIBROUS MATERIALS
Original Filed Feb. 7, 1933 3 Sheets-Sheet 1
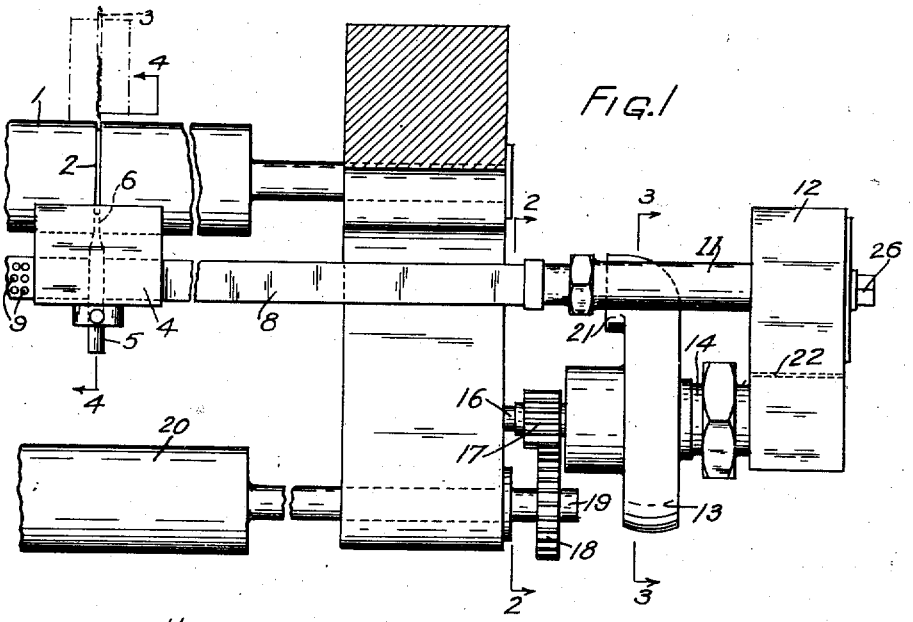
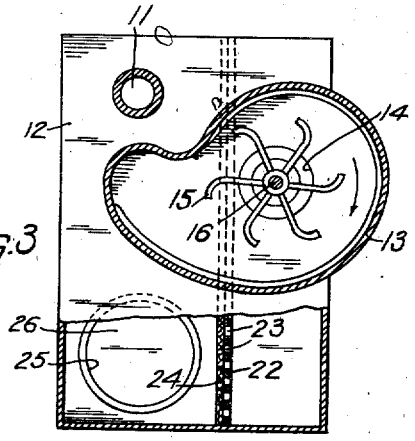
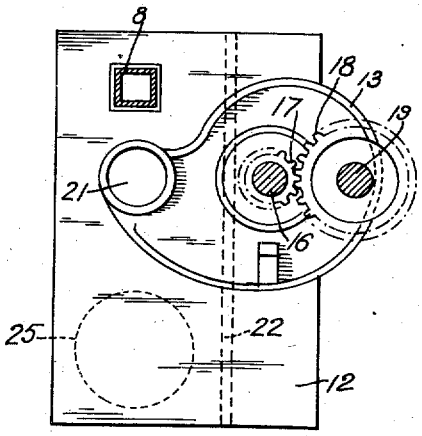
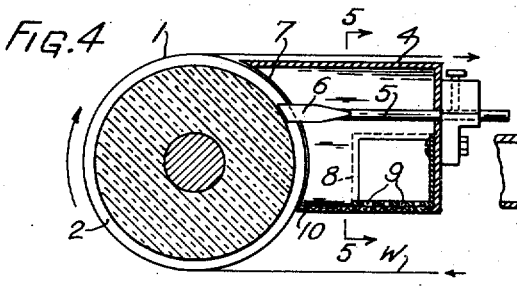
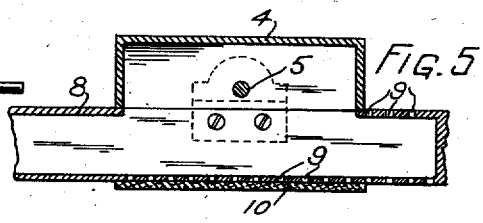
T. H. Grozier
INVENTOR
By: Marks & Clerk
Attys.

April 5, 1938. T. H. GROZIER Re. 20,687

MEANS FOR ARRESTING DUST AND FLUFF FROM MACHINES OR APPLIANCES FOR CUTTING PAPER AND OTHER FIBROUS MATERIALS

Original Filed Feb. 7, 1933 3 Sheets-Sheet 2

T. H. Grozier
INVENTOR

By: Marks & Clerk
Attys.

April 5, 1938. T. H. GROZIER Re. 20,687
MEANS FOR ARRESTING DUST AND FLUFF FROM MACHINES OR APPLIANCES FOR CUTTING PAPER AND OTHER FIBROUS MATERIALS
Original Filed Feb. 7, 1933 3 Sheets-Sheet 3
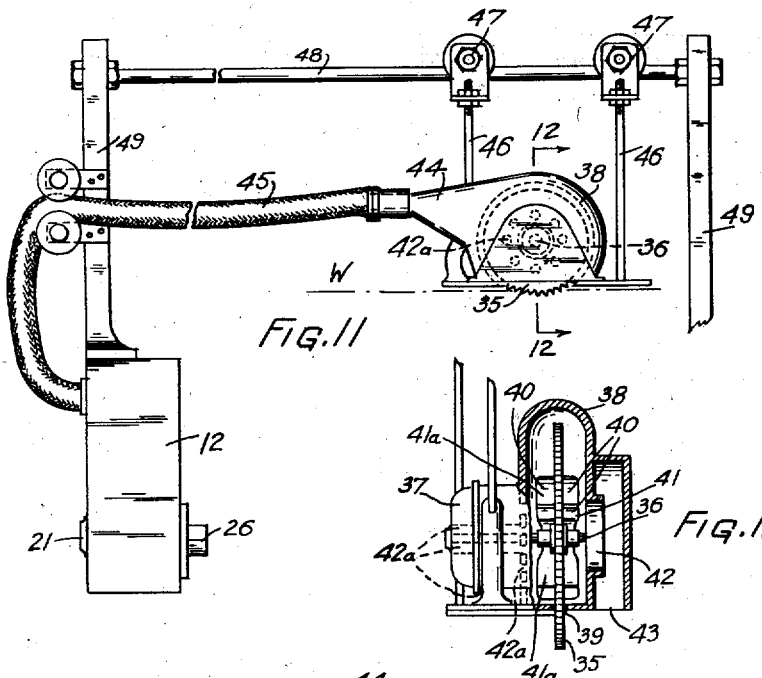
FIG. 11
FIG. 12
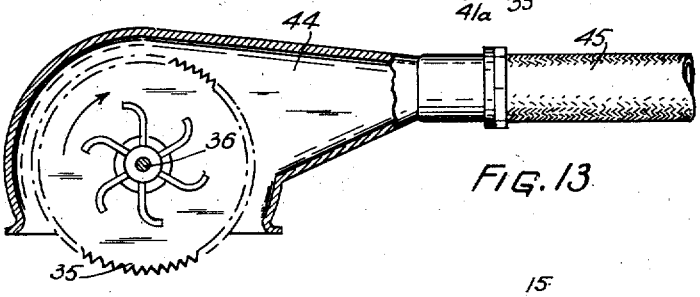
FIG. 13
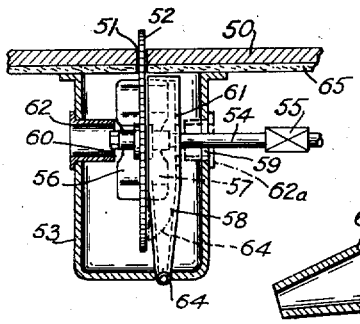
FIG. 15
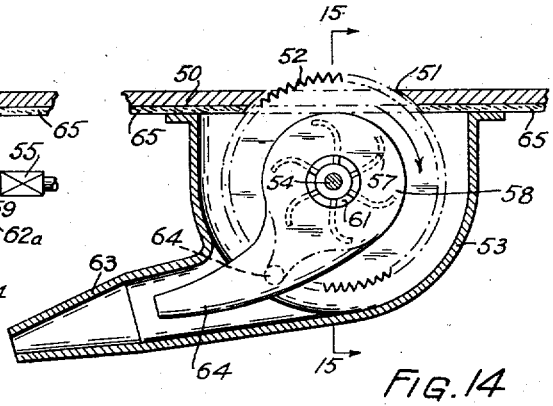
FIG. 14
T. H. Grozier
INVENTOR
By: Marks & Clerk
Att'ys Reissued Apr. 5, 1938

Re. 20,687

UNITED STATES PATENT OFFICE 20,687

MEANS FOR ARRESTING DUST AND FLUFF FROM MACHINES OR APPLIANCES FOR CUTTING PAPER AND OTHER FIBROUS MATERIALS

Thomas Hamilton Grozier, Greenwich Point, Sydney, New South Wales, Australia

Original No. 1,986,726, dated January 1, 1935, Serial No. 655,638, February 7, 1933. Application for reissue December 11, 1936, Serial No. 115,448. In Australia March 3, 1932

8 Claims. (Cl. 164—60)

This invention relates to improved means for arresting and collecting dust, fluff and other finely divided or cut particles formed by machines in sawing, cutting or slitting newsprint or other papers, cardboard, cloth, leather, wood and other relatively light and fibrous materials.

Machines employed for cutting, slitting, sawing or otherwise working such relatively light and fibrous materials generally operate at comparatively high speed with the result that dust and fluff, shortly cut hairs and other small particles are thrown by the rapidly moving cutting tools with considerable velocity into the surrounding air. Owing to their lightness and small size, such particles float about in the atmosphere and settle slowly upon machinery, manufactured stock, materials and other objects in the vicinity of the machines, thereby necessitating cleaning and removal of the precipitated fine dust or particles at comparatively frequent intervals. Moreover, the air-borne dust and other finely cut or divided particles are inhaled by persons operating the machines or engaged in their vicinity, and such persons in course of time have their health and physical fitness impaired if not seriously affected thereby.

In order to overcome the disadvantages attending the operation of high speed cutting machines in working fibrous materials of the kind referred to, there has been proposed an extensive independently driven dust exhausting plant, which is connected by conduits to the said cutting machines of a factory installation. Such a dust exhausting plant with the necessary conduits, fittings and prime mover (or plurality thereof) is of high initial cost and is also expensive in operation and maintenance while being relatively inefficient in many cases.

An object of the present invention is to provide simple means of comparatively small cost for arresting and collecting dust and finely comminuted particles which render unnecessary the installation of such extensive and high-priced dust-exhausting plant in a factory wherein machines are used for cutting, sewing, slitting or otherwise working fibrous materials.

Another object of the invention is to provide simple and inexpensive dust arresting and collecting means which are capable of operating at less cost and at higher efficiencies than the large and expensive dust-exhausting plants hitherto used for dust removal purposes.

A further object of the present invention resides in the provision of simple and inexpensive means which are adapted to arrest and totally remove the dust, fluff and other small portions or particles of matter at their points of origin or generation and as fast as they are formed so that they cannot be thrown into the surrounding atmosphere or mechanism by the high-speed cutting tools.

Yet another object of the invention is to provide simple and inexpensive means which are adapted to arrest, segregate and collect dust, fluff, shortly cut hairs, and other finely cut, comminuted or pulverized particles or portions of materials having a commercial value with high collective efficiency.

A still further object of my invention resides in the provision of simple and inexpensive means for arresting, segregating and collecting small particles or portions of light fibrous materials which means are especially adapted for application to and use with newspaper and magazine printing machines, paper cutting machines, and circular saws of portable and/or stationary bench type.

In operating high speed rotary web printing machines much time is wasted on editions because of the generation of paper dust, fluff, and minute particles at the web slitters, or paper cutting tools. Such dust and fluff are responsible for general uncleanliness in, over, and around the said printing machines. This condition results in more or less frequent cleansings and/or "wash-ups" on account of stereotype plates, inking cylinders and rollers becoming filled and/or smothered with finely divided, comminuted, and precipitated particles of paper. Otherwise, it is reflected in inferior printing, more especially in connection with half-tone illustrations and the like pictorial matter which occupy, today, a position of prime importance in newspapers, periodicals, or magazines. By means of my present invention the whole of said slitter-generated paper-dust or fluff is definitely arrested at its point or points of origin and afterwards immediately segregated and collected. Furthermore, my devices become and/or form an integral portion or component of a rotary web printing machine or the like mechanism or appliance.

In accomplishing the above mentioned objects of the invention, air circulating means are mounted on and operated by a machine used for cutting, sawing, slitting or otherwise working light fibrous materials, in any of which operations dust, fluff, or other small particles or portions of matter are formed in less or greater quantity. The air circulating means are adapted to suctionally draw air into and through arresting means positioned in the immediate vicinity of the cutting tools. A strong air current is induced into the arresting means by said air-circulating means, and the air in passing through the arresting means becomes charged with dust or other small portions or particles of material. The dust-laden air is sectionally drawn or impelled by the air-circulating means through a dust extracting and collecting chamber positioned on or near the machine and having separating means whereby the dust is segregated and extracted from the air and precipitated within the said chamber. The air, after extraction of the dust or other particles therefrom, is discharged at desired locations into the atmosphere.

The air-circulating means may be positioned either adjacently to or apart from the cutting tool of a machine. In many instances it may be arranged to rotate with the cutting tool and it may be mounted with the cutting tool in a casing which also functions as an arresting box and is connected by a conduit with the dust-extracting and collecting chamber.

Reference being had to the accompanying explanatory drawings:

Fig. 1 is a plan view showing the invention applied to a rotary web printing machine.

Fig. 2 is a transverse section on the line 2—2 in Fig. 1.

Fig. 3 is a sectional view taken on the line 3—3 in Fig. 1.

Fig. 4 is a transverse section on the line 4—4 in Fig. 1.

Figure 5 is a sectional view on the line 5—5 in Fig. 4.

Figure 11 is a side elevation of a modification of the invention as applied to machines used in cutting paper, cardboard, or other fibrous materials.

Figure 12 is a sectional view taken on the line 12—12 of Fig. 11.

Figure 13 is an enlarged sectional elevation of the saw, fan, casing and delivery tube, and is a detail of Fig. 11 on a larger scale.

Figure 14 is a sectional elevation of the invention as applied to a stationary circular saw bench.

Figure 15 is a sectional view taken on line 15—15 of Fig. 14.

Figure 6:
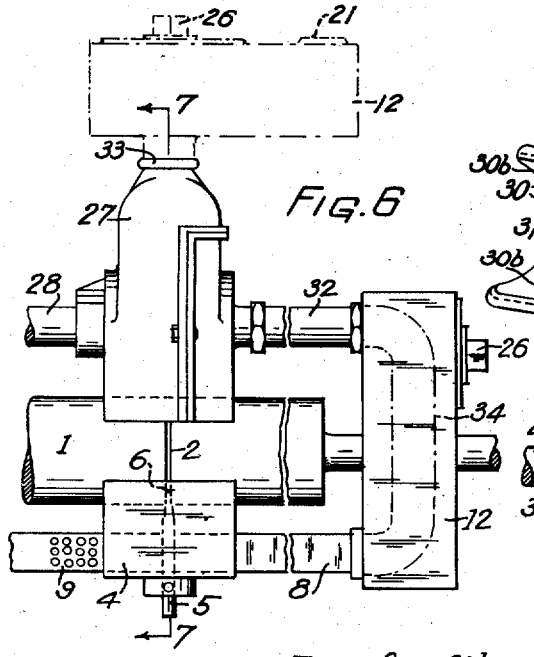
Figure 6 is a plan of an alternative form of the invention applied to a rotary web printing machine.
Figure 8:
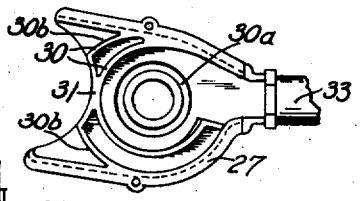
Figure 8 is a side elevation detailing the slitter and fans casing shown in Fig. 7.
Figure 9:
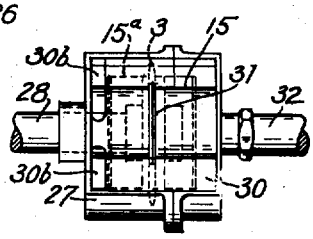
Figure 9 is a front elevation detailing the slitter, slitter shaft, fans casing and suction tube shown in Fig. 7.

Referring more particularly to Figures 1 to 5 of these drawings, 1 indicates a web-roller of a printing press having formed therein a slot 2 which co-operates with a rotary cutting blade or slitter 3 to sever a web of paper as it passes around the periphery of the roller 1.

Adjustably mounted in a dust arresting casing or box 4 is a rod 5, the extremity of which projects into the slot 2 and is shaped to form a cleaning blade 6 adapted to dislodge from said slot dust and fine particles formed in cutting the paper web W (see Fig. 4). The arresting box 4 is positioned closely to, but out of contact with, the roller 1, there being a narrow opening or clearance space 7 between said box and roller. The arresting box may be mounted upon a tube 8 which may be square in section and conveniently substituted for the solid square bar customarily provided on certain printing machines, or alternatively such tube may be of any suitably shaped section and/or in the form of an addition thereto. The top and side of the portion of the tube 8 within the arresting box 4 are removed to afford free communication between said box and tube, see Figures 4 and 5.

The square tube 8 is provided with holes 9, some of which are made in the lower side of the portion of the tube within the arresting box 4 and are covered by gauze or mesh 10, while others of said holes are formed in said tube adjacently to but exteriorly of the arresting box 4. The tube 8 is connected by a tubular extension 11 to a dust-extracting and collecting chamber 12 which is associated with a casing 13 by a tubular connection 14.

Within the casing 13 is a fan 15, see Fig. 3, which is mounted on a spindle 16 and is rotated at high speed by gears 17 and 18, the latter gear being conveniently fixed to the shaft 19 of another web-roller 20 of the printing press. The said roller may be driven by the paper-web, or, alternatively, by connected gearing.

The tubular connection 14 is attached to the casing 13 so as to be disposed in co-axial alignment with the fan spindle 16, see Fig. 3, and said connection forms the suction inlet to the fan 15. The connection 14 communicates with the atmosphere by way of the dust-extracting chamber 12, tubular extension 11, square tube 8, holes 9 and narrow openings 7, so that when the fan 15 is in operation a strong current of air will be drawn inwardly through the narrow openings 7 and the holes 9 situated both within and without the box 4. The air then passes through the tube 8, tubular extension 11, dust-extracting chamber 12 and tubular connection 14 into the casing 13 from which it is ejected by the fan 15 through an outlet 21 in said casing into the atmosphere.

The operation of my invention is as follows:

When paper is being severed by the co-operation of the slitter 3 and the slot 2, dust and minute scraps of paper are liberated in the arresting box 4 and are carried by the strong current of air induced by the fan 15 through the tube 8 and extension 11 into the extracting and collecting chamber 12. This chamber is provided with one or more partitions 22 having therein perforations 23 covered by fine mesh or gauze 24 through which the dust-laden air passes—see Fig. 3. The dust and minute particles of paper are extracted by the mesh or gauze 24 and are deposited within the chamber 12 from which they are removed, as and when required, through a suitable opening 25 upon removal or manipulation of a cover 26 therefrom.

The air after passing through the mesh or gauze 24 is free of dust and fine particles, and it is discharged back into the atmosphere through the outlet 21 of the fan-casing 13. In this manner, dust and small particles of materials, generally of commercial value, may be collected and prevented from passing into and fouling the surrounding atmosphere and also the components of a rotary web printing machine without in any way reducing its efficiency of operation. On the contrary, the efficiency of such machines is increased thereby because fewer cleansing operations are required and, moreover, cleaner printing results from the use of this invention.

Figure 10:
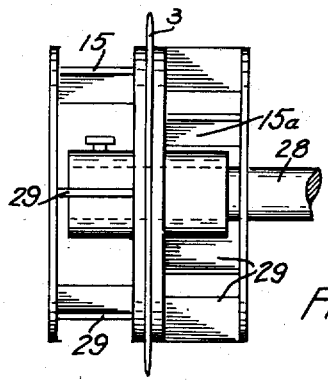
Figure 10 is a side elevation of a further detail of the fans shown in Figs. 7 and 9.

Attention being directed more particularly to Figs. 6 to 10 of the drawings, the slitter 3 and fans 15 and 15a, instead of being spaced apart and independently operated, are encased in a housing 27 and fixed upon a press driven slitter-shaft 28 rotatably mounted in said housing. The slitter 3 is preferably mounted between the fans 15 and 15a in a central position, and said fans are provided with blades 29 which may be positioned on opposite sides of the slitter 3 in staggered relationship as shown in Fig. 10, or in any other preferred manner.

Figure 7:
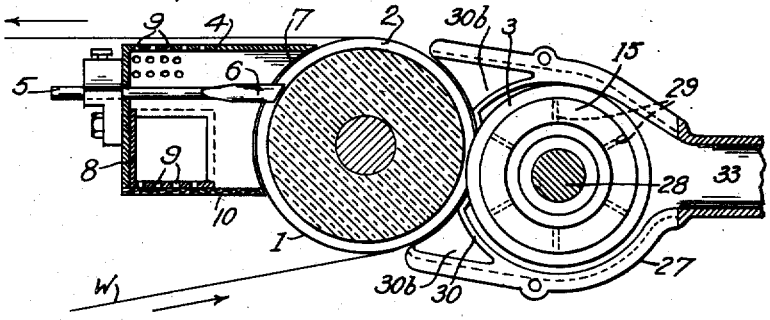
Figure 7 is a transverse section taken on the line 7—7 in Fig. 6.

The casing 27, which may be made in two parts, see Fig. 6, is positioned closely to, but out of contact with, the web-roller 1 as shown in Fig. 7. The said casing is provided with walls 30 having air ports 30a and 30b formed therein, and the slitter 3 projects through a narrow slot 31 formed in the said walls.

A tube 32 is connected to the casing 27 in coaxial alignment with the slitter shaft 28, and said tube is connected with an extracting and collecting chamber 12 constructed as previously described. The chamber 12 is connected to the square tube 8 which carries an arresting box 4 and cleaning rod 5 and blade 6 constructed as hereinbefore described. Additional air holes 9 may be provided in the upper parts of the ends of the arresting box 4 or formed in the square tube 8 as previously described, see Figs. 5, 6 and 7, to ensure turbulence of the air in said box and consequent effective scouring of the same.

In operation, the slitter 3 severs a web of paper passing over the roller 1, and at the same time the fan 15, which rotates with the slitter 3, induces a powerful blast of air through the holes 9 into and through the arresting box 4, tube 8, extracting and collecting chamber 12, and tube 32 into the casing 27. The air, so induced into the casing 27, is expelled through an outlet 33 into the atmosphere. In its passage through the arresting box 4, the air becomes charged with dust and minute particles of paper which are segregrated and deposited in the chamber 12 so that the air enters the casing 27 free of dust. Instead of the extracting and collecting chamber 12 being positioned between the arresting box and the casing 27, said chamber having an air outlet 21 may be attached to the outlet 33, and the tube 8 may be connected to the tube 32 by a bent pipe or conduit 34, as shown by chain-dotted lines in Fig. 6. The fan 15a, which also rotates with the slitter 3 and fan 15, operates directly upon the said slitter 3 and that section of the web-roller 1 surrounded by the casing 27, functioning in such manner as to induce a continuous current of air through the air ports 30a and 30b into the casing 27. The air is then expelled through the outlet 33 into the extracting and collecting chamber 12 and then through the outlet 21 into the atmosphere as previously described. Any dust or minute particles of paper which may segregate or become deposited within that portion of the casing 27 surrounding the web-roller 1 is thereby arrested, extracted and collected in said chamber 12.

Reference being had to Figures 11, 12 and 13 of the drawings, 35 indicates a circular saw, such as is used in machines for cutting paper webs or sheets, cardboard or other fibrous materials. The said circular saw 35 is fixed upon a spindle 36 of a direct coupled electric motor 37, or said saw may be gear driven by the motor 37. The saw 35 is mounted in a casing 38, and said saw projects through a slot 39 formed in the base of the said casing. Mounted on opposite sides of the saw 35 are blades 40 of fans 41 and 41a. A suction inlet 42, (preferably having an enveloping air passage 43) is formed in the casing 38, while air inlets 42a are also provided in the electric motor, so that air may pass through said motor into the interior of said casing 38. The casing 38 is provided with a substantially tangential tapered outlet 44, to which is connected a flexible tube 45 attached to an extracting and collecting chamber 12 having an air outlet 21 and constructed as hereinbefore described.

The casing 38, saw 35 and electric motor 37 (forming a portable saw equipment) may be suspended in the manner usual in paper web or sheet cutting machines and/or the like appliances, as for example, by rods 46 which depend from trolleys 47 mounted on a rail 48 supported in an elevated position by standards 49.

In operation, the housing 38 is moved along a laminated plurality of paper-webs W or like fibrous materials, the saw 35 being driven by the electric motor 37 and cutting the paper-webs W as it travels. Dust formed by the saw 35 in cutting the paper is drawn upwardly by the saw teeth into the casing 38 and centrifugally collected by the air currents generated by the fans 41 and 41a, which preferably pass through the enveloping air passage 43 and inlets 42 and 42a into the casing 38. The dust-laden air is impelled from the casing 38 through the tube 45 and the dust extracting and collecting chamber 12, from which the dust-freed air escapes back into the atmosphere through an opening or outlet 21 formed at any approved location therein.

In Figures 14 and 15 of the drawings, 50 indicates the table of a stationary saw-bench having therein a narrow slot 51 through which projects a circular saw 52. The saw 52 is enclosed within a casing 53 secured to the underside of the saw-bench table 50 and is fixed upon a spindle 54 mounted upon outside bearings 55. Suitably mounted upon opposite sides of the saw 52 are fans 56 and 57, the latter fan being enclosed within an inner casing 58. The casing 53 has air inlets 59 and 60 formed in the sides thereof, whilst the inner casing is also provided with an air inlet 61, preferably in alignment with the inlet 59 formed in the wall of the casing 53. The air inlet 60 comprises an adjustable flanged tube 62, which extends into the casing 53 as shown in Figure 15. If desired, an adjustable flanged tube 62a may be readily inserted within the inlet 59, as shown in chain-dotted lines. The casing 53 is provided with a tangentially disposed tapered tubular outlet 63, within which is a nozzle 64 forming an extension of the inner casing 58. To the underside of the table 50 there may be fixed a lining 65 of felt or like material which is positioned closely to, but out of contact with, the saw 52 so that dust and fluff may be prevented from passing out through the slot 51, and the top flanges of the casing 53, more especially when the said table, slot and casing are imperfectly fitted or shaped.

When the saw 52 is in operation and the fans 56 and 57 are rotating therewith, the former fan 56 sets up turbulence within the casing 53 and causes whirling of the dust and fluff therein while the fan 57 draws the dust and fluff charged air through the inlet 61 into the inner casing 58. The dust and fluff charged air is expelled by the fan 57 through the nozzle 64 into the tapered tubular outlet 63 in which the strong jet of air escaping from said nozzle sets up evacuative action and causes a lowering of the pressure within the casing 53. The fall of pressure within the casing 53 causes air to pass downwardly through the slot 51 and through the clearance space between the saw 52 and the felt lining 65, the downwardly moving air carrying with it the dust and fluff formed by the saw 52 into the casing 53, from which said dust and fluff are ejected by the fan 57 in the manner above described. The tapered tubular outlet 63 may be connected to a dust extracting and collecting chamber 12 constructed as hereinbefore described so that the air may be freed of dust and fluff before being returned to the atmosphere.

In some cases, the inner housing 58 may be modified in shape as shown by dotted lines in Figure 14, so that the nozzle 64 may be directed towards the teeth of the saw 52 to remove therefrom adhering particles of dust and fluff of more or less clinging or adhesive nature.

In the reference in the specification and claims to the term "high speed", there is meant a web traveling at a speed having an approximate minimum of 750 feet a minute.

The improved means for arresting and collecting dust and other finely divided particles or shortly cut portions of matter described, is of simple construction and can be applied with equal facility to rotary web printing presses, paper cutting and similar machines during their construction, or to existing machines previously installed and now in use. Moreover, the invention is comparatively inexpensive and it will be found highly satisfactory for maintaining air in the precincts of a machine or machines operating on fibrous materials in a hygienic state; for keeping said machinery in a clean and efficiently operative condition and also for conveniently and reliably collecting finely divided particles or shortly cut portions having a commercial value.

What I do claim is:

1. In machines used in cutting paper, cardboard or other fibrous materials, embodying a suitable electric motor and a cutting element operated thereby; means for arresting and collecting dust, fluff, and minute particles formed by the cutting element comprising a casing enclosing the cutting element, a slot for the cutting element in the casing, fan blades mounted on both sides of the cutting element, an air inlet in the casing, an outlet on the casing, a dust-extracting and collecting chamber, a conduit connecting the outlet of said casing with the said chamber, and an air outlet on the dust-extracting and collecting chamber.

2. In machines used in cutting paper, cardboard or other fibrous materials, embodying a suitable electric motor and a cutting element operated thereby, means for centrifugally arresting and collecting dust, fluff, and minute particles formed by the cutting element, as claimed in claim 1, wherein an enveloping air passage surrounds an air inlet of the cutting element casing for the purpose of suctionally arresting and collecting from the adjacent atmosphere any escaping minute particles of dust and/or fluff.

3. In a paper cutting mechanism for association with high speed rotary web printing machines, a slotted casing, a rotary cutter projecting through the slotted casing; means for arresting and collecting dust and minute particles of fibrous materials formed by the cutting element including an outlet on the casing, an inlet on each side of the casing, fans on opposite sides of the cutter, an inner housing enclosing one of the fans, a nozzle on the inner housing located within said outlet, and an inlet in the inner housing.

4. An arrangement as claimed in claim 3, wherein the nozzle of the inner housing is located in the outlet of the outer casing for the purpose of setting up evacuative action and lowering the pressure within said casing.

5. An arrangement as claimed in claim 3, wherein the nozzle on the inner housing is positioned to direct a jet of air on to the cutting edge of the rotary cutter.

6. An arrangement as claimed in claim 3, wherein the fan in the inner housing draws dust-charged air into the housing and discharges the air through the nozzle to lower the pressure in the casing, and wherein the other fan sets up air turbulence and whirling of the dust particles in said casing.

7. In cutting and dust arresting means for high speed traveling web, comprising a roller over which the web is slit, web fluff moving at high speed, said roller being formed with a peripheral channel, a cutter operating on the web in line with the channel to slit the web, a dust arresting box having an entrant end conforming to the periphery of the roller and extending over and closely adjacent a material portion of said periphery substantially diametrically opposite the cutter and below the plane of the slit web, a clearing blade arranged in the box and having an operative end seated in said channel to clear from the latter the accumulated material incident to the severing of the web, a dust extracting and collecting chamber in open communication with the dust arresting box, and means for creating a suction in the dust arresting box and for withdrawing material from said box for collection in the dust extracting and collecting chamber.

8. In cutting and dust arresting means for high speed web traveling at a speed in excess of 750 linear feet per minute, comprising a roller over which the web is slit, web fluff moving at high speed, said roller being formed with a peripheral channel, a cutter operating on the web in line with the channel to slit the web, a dust arresting box having an entrant end conforming to the periphery of the roller and extending over a material portion of said periphery at a point substantially diametrically opposite the region of the cutter and below the plane of the slit web, a clearing blade adjustably arranged in the box and having an operative end seated in said channel to clear from the latter the accumulated material incident to the slitting of the web, a dust extracting and collecting chamber in open communication with the dust arresting box, and a fan for creating suction in the dust arresting box, and for withdrawing material from said box for collection in the dust extracting and collecting chamber.

THOMAS HAMILTON GROZIER.